(12) United States Patent
Lape et al.

(10) Patent No.: US 9,746,305 B2
(45) Date of Patent: Aug. 29, 2017

(54) UNEVEN SURFACE DEFLECTION AND AMPLITUDE MEASUREMENT TOOL

(71) Applicant: General Electric Company, Schenectady, NY (US)

(72) Inventors: Brock Matthew Lape, Clifton Park, NY (US); David Pate Hughes, Pasadena, TX (US); Stuart Alan Oliver, Malvern, AR (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 527 days.

(21) Appl. No.: 14/509,751

(22) Filed: Oct. 8, 2014

(65) Prior Publication Data

US 2016/0102961 A1  Apr. 14, 2016

(51) Int. Cl.
*G06F 19/00* (2011.01)
*G01B 5/207* (2006.01)

(52) U.S. Cl.
CPC .................. *G01B 5/207* (2013.01)

(58) Field of Classification Search
CPC ............... B41J 2/4427; B41J 2002/041; B41J 2002/14346
USPC ................................ 702/150, 155, 182–185
See application file for complete search history.

(56) References Cited

U.S. PATENT DOCUMENTS

| 5,871,391 A | * | 2/1999 | Pryor | ........................ F02F 1/24 356/600 |
| 8,645,096 B2 | | 2/2014 | Lape et al. | |
| 2006/0040233 A1 | * | 2/2006 | Weinstein | .............. A61B 5/103 433/72 |

* cited by examiner

*Primary Examiner* — Edward Raymond
(74) *Attorney, Agent, or Firm* — Ernest G. Cusick; Hoffman Warnick LLC

(57) ABSTRACT

A first aspect of the invention provides an apparatus to indicate an amplitude of an uneven measurement surface. The apparatus may include a frame slidingly supporting a set of pins, each pin including a high point stop and a low point stop; a low point isolator member moveable relative to the frame, the low point isolator member indicating a lowest point of the uneven measurement surface by a respective low point stop of a first; a high point isolator member moveable relative to the frame, the high point isolator member indicating a highest point of the uneven measurement surface by a respective high point stop of a second pin; a low point displacement sensor for identifying a low point displacement; a high point displacement sensor for identifying a high point displacement; and a calculator for calculating a difference between the low point displacement and the high point displacement.

22 Claims, 8 Drawing Sheets

UNEVEN SURFACE DEFLECTION AND AMPLITUDE MEASUREMENT TOOL

BACKGROUND OF THE INVENTION

The disclosure relates generally to an apparatus for measuring an amplitude of an uneven measurement surface in industrial machines. More particularly, the disclosure relates to a system for measuring a deflection of a ripple spring in a stator core winding slot.

Deflection may be defined as the amount a structural component is displaced or deformed under a load. In many industrial machines, such as, for example, large scale generators, components such as ripple springs are compressed during installation. A ripple spring is an elongated substantially sinusoidal spring element that is placed between a stator core winding and a slot for the winding in a compressed state to secure the stator core winding in the slot. The deflection of a ripple spring is measured to ensure that the compression of the spring is within desired tolerances. A difference between a highest point of the spring and a lowest point of the spring is indicative of the amount of deflection.

Previous deflection measuring methods included manually measuring the relative positions of a number of points on the ripple spring using a pin gauge to determine the overall deflection of the ripple spring. This method required that a technician insert a single-pin gauge into each hole of a wedge that secured the ripple spring, one at a time. Once a displacement measurement was taken at each hole within the wedge, the engineer either had to record each displacement measurement or commit each measurement to memory. Then, the engineer manually calculated the difference between the displacement measurements of the pins to arrive at the deflection measurement. Generally, there are many ripple springs within a particular slot, and hundreds of slots within a single generator. Therefore, the amount of time spent on taking these measurements within a single generator was quite lengthy.

Another previous measurement method employed a deflection measurement system having a number of sensors between at least two alignment pins, wherein each sensor measured its own relative position when engaging a ripple spring. Subsequently, the deflection of the ripple spring was manually calculated by evaluating the differences in the relative positions of each sensor. However, this device was quite large as each sensor was connected to a processor that had to be carried by the engineer while taking measurements of the ripple spring, making the process time consuming and cumbersome. Additionally, the wiring of this device was expensive and made the device unwieldy.

BRIEF DESCRIPTION OF THE INVENTION

A first aspect of the invention provides an apparatus to indicate an amplitude of an uneven measurement surface. The apparatus can include a frame slidingly supporting a set of pins, each pin individually spring biased to engage the uneven measurement surface, each pin including a high point stop and a low point stop fixedly coupled thereto; a low point isolator member moveable relative to the frame, the low point isolator member indicating a lowest point of the uneven measurement surface engaged by the set of pins based on engagement of the low point isolator member by a respective low point stop of a first pin in the set of pins that engages a low point of the uneven measurement surface; a high point isolator member moveable relative to the frame, the high point isolator member indicating a highest point of the uneven measurement surface engaged by the set of pins based on engagement of the high point isolator member by a respective high point stop of a second pin in the set of pins that engages a high point of the uneven measurement surface; a low point displacement sensor fixedly coupled to the frame, and having a first sensor tip engaging the low point isolator member for identifying a low point displacement; a high point displacement sensor fixedly coupled to the frame, and having a second sensor tip engaging the high point isolator member for identifying a high point displacement; and a calculator for calculating a difference between the low point displacement and the high point displacement, the difference indicative of the amplitude of the uneven measurement surface.

A second aspect of the invention provides a system for measuring a deflection of a ripple spring in a stator core winding slot from a free-state of the ripple spring. The system may include a frame slidingly supporting a set of pins, each pin individually spring biased to engage the ripple spring, each pin including a high point stop and a low point stop fixedly coupled thereto, a low point isolator member moveable relative to the frame, the low point isolator member indicating a lowest point of the ripple spring engaged by the set of pins based on engagement of the low point isolator member by a respective low point stop of a first pin in the set of pins that engages a low point of the ripple spring; a high point isolator member moveable relative to the frame, the high point isolator member indicating a highest point of the ripple spring engaged by the set of pins based on engagement of the high point isolator member by a respective high point stop of a second pin in the set of pins that engages a high point of the ripple spring; a low point displacement sensor fixedly coupled to the frame, and having a sensor tip engaging the low point isolator member for identifying a low point displacement; a high point displacement sensor fixedly coupled to the frame, and having a sensor tip engaging the high point isolator member for identifying a high point displacement; and a calculator for calculating a difference between the low point displacement and the high point displacement, the difference indicative of the deflection of the ripple spring.

A third aspect of the invention provides a probe assembly for measuring an amplitude of an uneven measurement surface. The probe assembly may include a frame slidingly supporting a set of pins, each of the set of pins being individually spring biased to engage the uneven measurement surface, each pin including a high point stop and a low point stop fixedly coupled thereto; means for sensing a low point displacement at a low point of the uneven measurement surface and a high point displacement at a high point of the uneven measurement surface based on a location of two of the set of pins; and a calculator for calculating a difference between the low point displacement and the high point displacement, the difference indicative of the amplitude of the uneven measurement surface.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
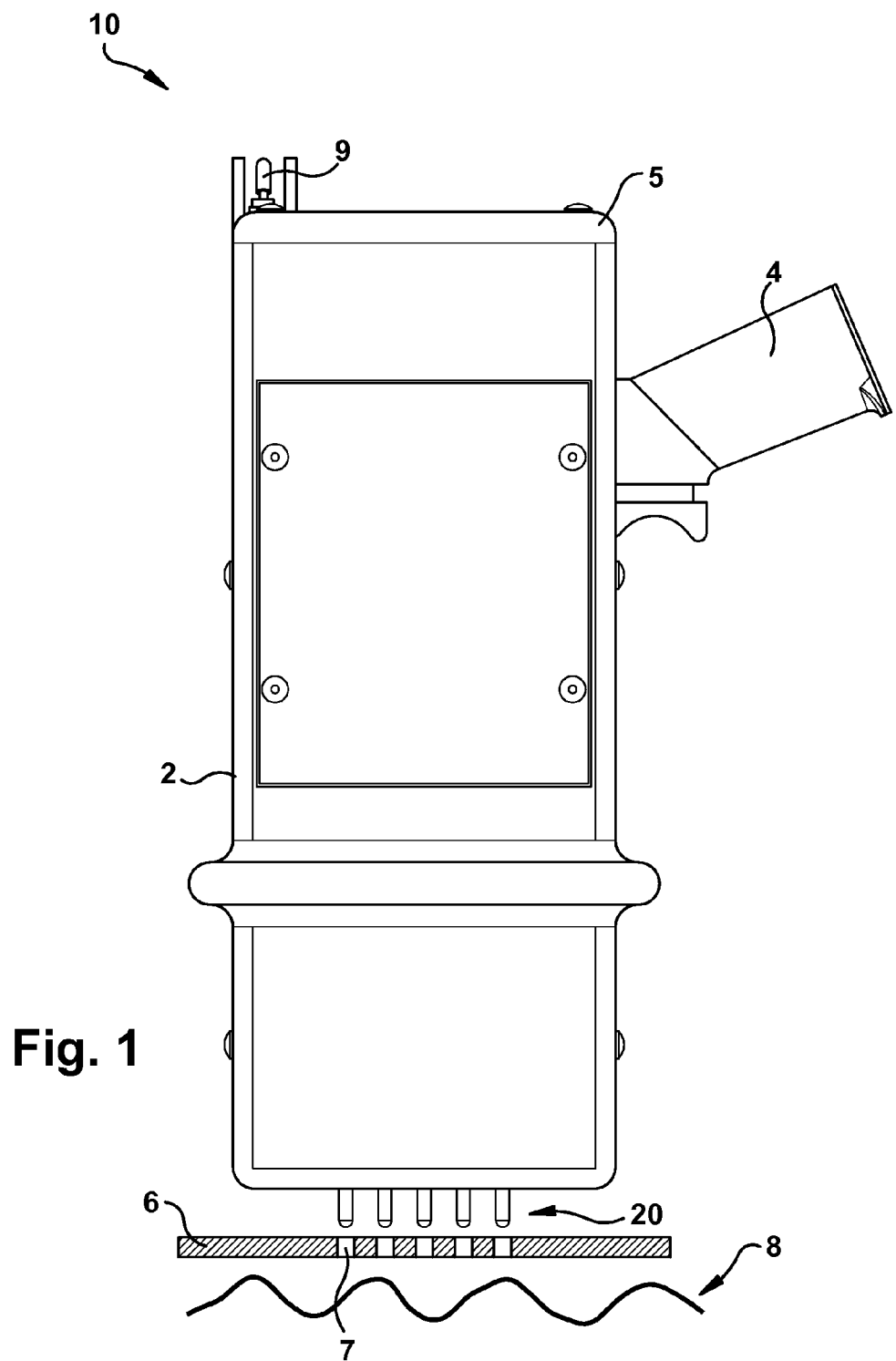
FIG. 1 shows a perspective view of the deflection and amplitude measurement tool.

It is noted that the drawings of the invention are not necessarily to scale. The drawings are intended to depict only typical aspects of the invention, and therefore should be considered as limiting the scope of the invention. In the drawings, like numbering represents like elements between the drawings.

DETAILED DESCRIPTION OF THE INVENTION

As discussed herein, aspects of the invention relate generally to an apparatus for measuring an amplitude of an uneven measurement surface in, for example, industrial machines. In one embodiment, as discussed herein, aspects of the invention relate to a system for measuring a deflection of a ripple spring in a stator core winding slot. Embodiments of the invention provide a deflection and amplitude measurement tool that reduces the amount of time necessary to take a deflection measurement, and decreases the overall size and cost of manufacturing the measurement tool. While the teachings of the invention will be described relative to the setting of a ripple spring in a stator core winding slot, it is understood that the teachings of the invention find applicability in other settings.

Referring to FIG. 1, a perspective view of a deflection and amplitude measurement tool 10 is shown. Measurement tool 10 may be used to indicate an amplitude of an uneven measurement surface. The amplitude may be used as an indication of a deflection of a ripple spring 8 in a stator core winding slot from a free-state of the ripple spring. Measurement tool 10 may include an outer housing 2. Housing 2 may be made of any material sufficient to support and protect the inner parts of tool 10, such as a hard plastic or other suitable materials. Housing 2 may include a handle 4 and an end portion 5. Handle 4 may be coupled to housing 2 such that a user of tool 10 may easily carry and operate tool 10. For example, handle 4 may be a pistol grip. As also shown in FIG. 1, measurement tool 10 may include a power switch 9 which is configured to turn the power on and off of a calculator 80 (FIG. 6) and a set of pins 20, both of which will be described in more detail herein.

Generally, ripple spring 8 in a core winding slot (not shown) is secured by wedge 6 which includes a number of holes 7 to allow insertion of a device to take a deflection measurement. During operation of measurement tool 10, user (not shown) inserts set of pins 20 into wedge 6 to engage ripple spring 8. Each of the pins in the set of pins 20 engage ripple spring 8 and will adjust their relative position based on their position on ripple spring 8. As described in more detail herein, each pin includes a low point stop and a high point stop. As set of pins 20 engage ripple spring 8, low point stops and high point stops of each pin will adjust relative to their respective pins. The lowest of the low point stops engages a low point isolator member and the highest of the high point stops engages a high point isolator member. Low point isolator member indicates a low point displacement and high point isolator indicates a high point displacement. Measurement tool 10 includes a calculator 80 (FIG. 6) to determine an amplitude of ripple spring 8 based on the identified low point displacement and high point displacement. As will be described, the amplitude is indicative of the deflection when the free-state amplitude of the ripple spring is known. The low point displacement corresponds to the change in position of the pin in the set of pins 20 that is positioned at a lowest point of the ripple spring 8. The high point displacement corresponds to the change in position of the pin in the set of pins 20 that is positioned at the highest point of the ripple spring 8. An amplitude measurement is calculated by taking the difference between the high point displacement and the low point displacement and displayed on a display 84.

Figure 2:
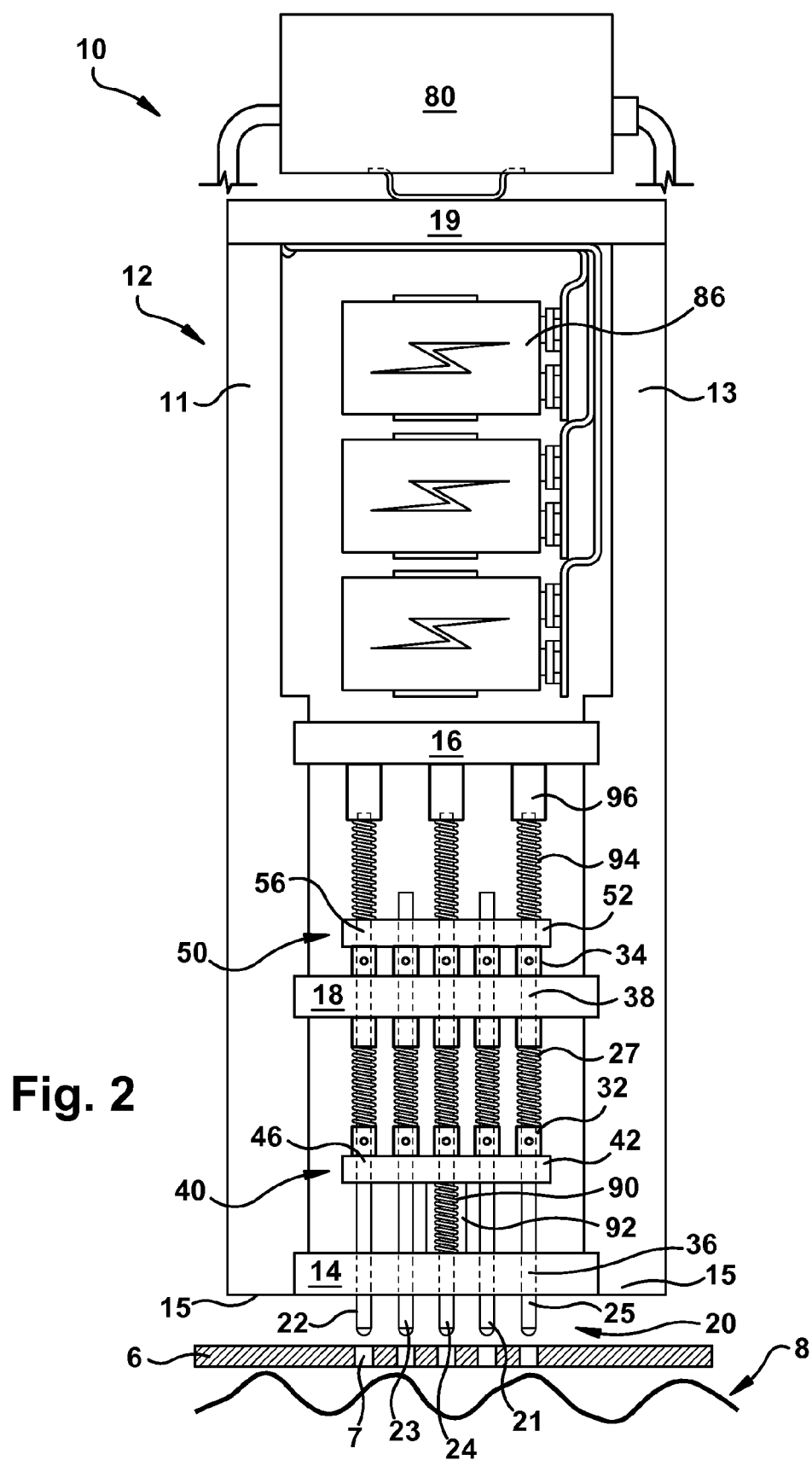
FIG. 2 shows a front side perspective view of the deflection and amplitude measurement tool.
Figure 3:
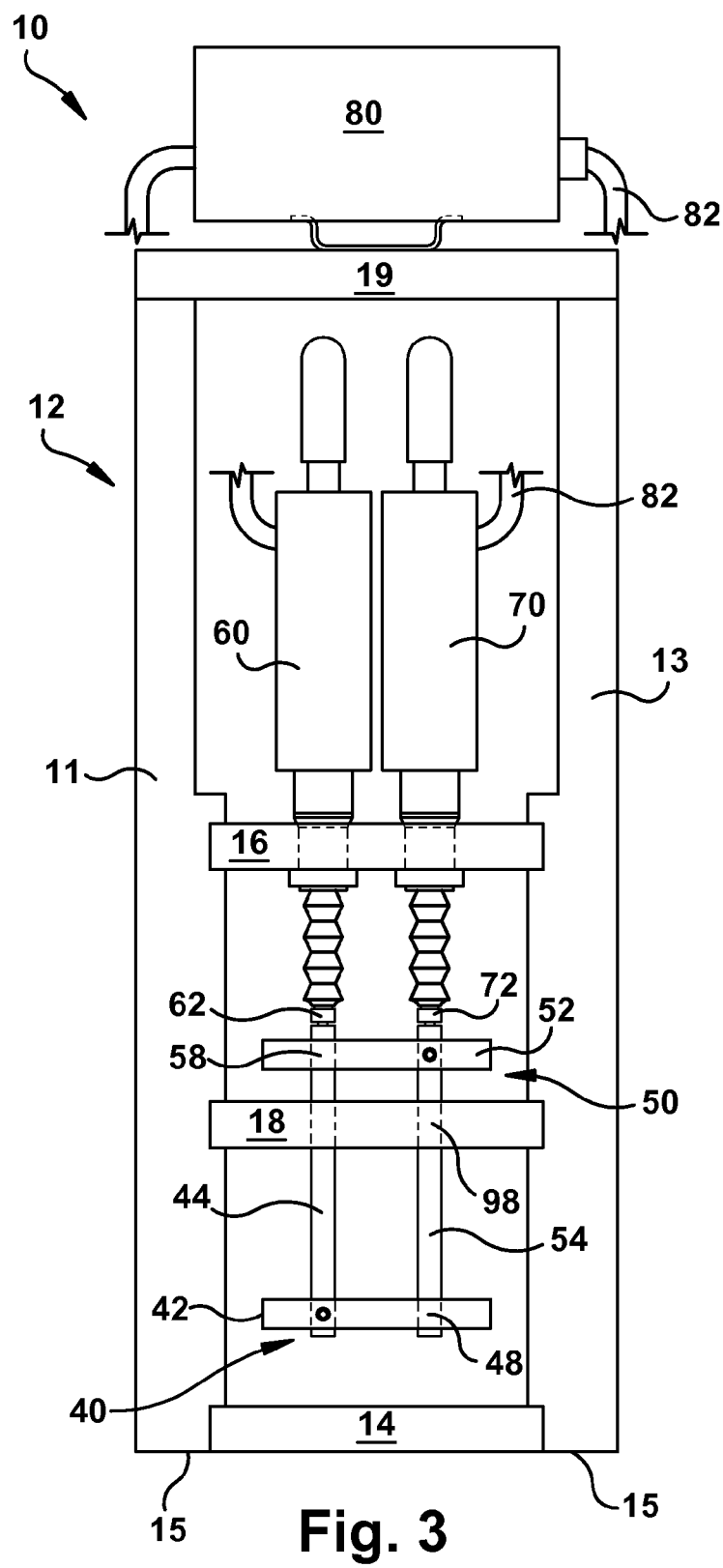
FIG. 3 shows a back side perspective view of the deflection and amplitude measurement tool.
Figure 4:
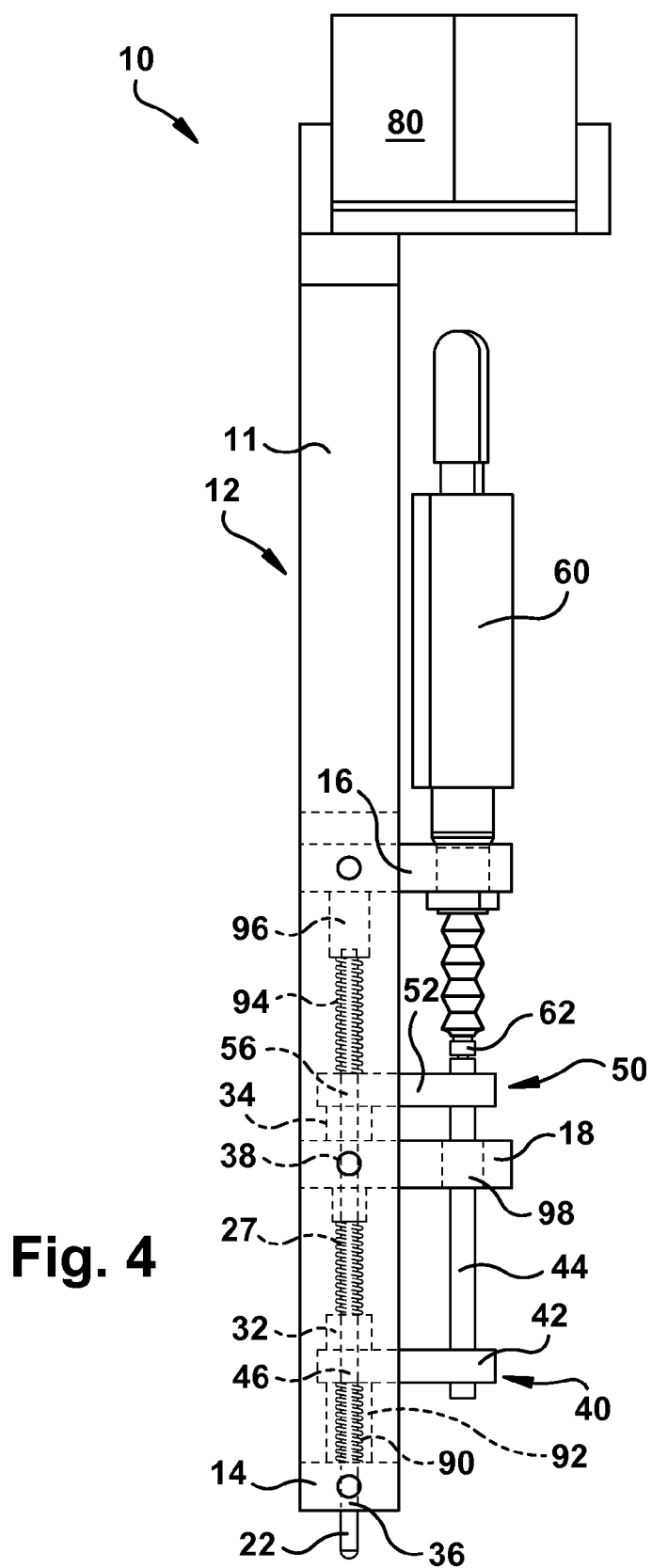
FIG. 4 shows a partial side profile view of the deflection and amplitude measurement tool.

FIG. 2 shows a front side of one embodiment of the amplitude and deflection measurement tool 10 with housing 2 removed. FIG. 3 shows a back side of one embodiment of tool 10 with housing 2 removed. FIG. 4 shows a partial side profile view of tool 10 with housing 2 removed. Referring now to FIGS. 2-4 together, deflection and amplitude measurement tool 10 may generally include a frame 12, a set of pins 20, a low point isolator member 40, a high point isolator member 50, a low point displacement sensor 60, a high point displacement sensor 70, and calculator 80.

Frame 12 may be coupled within housing 2 (FIG. 1) using any appropriate manner of fixation, e.g., fasteners, adhesives, etc. Housing 2 substantially surrounds frame 12. Frame 12 may include a pair of side members including a first side member 11 and a second side member 13. First and second side members 11, 13 may be substantially parallel to each other and positioned relative to one another by a number of cross-members. For example, side members 11, 13 may be positioned by a first cross-member 14, a second cross-member 16, and a third cross-member 18. Each cross-member 14, 16, 18 may be coupled between first and second side members 11, 13 such that each cross-member 14, 16, 18 is substantially parallel with the other cross-members 14, 16, 18, and is substantially perpendicular in relation to first and second side members 11, 13. A fourth cross-member 19 may further couple side members 11, 13. Each side member 14, 16, 18, 19 and cross-member 11, 13 may be made of a sufficiently rigid and preferably light material to allow formation of a substantially rigid frame 12. For example, each member may include hard plastic or a metal, e.g., aluminum. Each member is coupled to one another using any appropriate manner of fixation, e.g., welding, fasteners, integral molding, etc. First cross-member 14 may include a set of alignment openings 36 through which set of pins 20 extend. Third cross-member 18 may also include a set of alignment openings 38 through which set of pins 20 extend. Alignment openings 36, 38 may slidingly receive and align each pin 21-25 in set of pins 20, i.e., such that pins 21-25 slide substantially parallel to one another and relative to frame 12.

In one embodiment, first cross-member 14 may protrude slightly beyond an end portion 15 of first and second side members 11, 13 so that first cross-member 14 abuts a component that may be securing the uneven measurement surface. In the ripple spring example, a wedge 6 of a stator core (not shown) secures the ripple spring 8. Wedge 6 may include a number of holes 7 through which set of pins 20 may extend to engage the uneven measurement surface of the ripple spring. Alternatively, first cross-member 14 may be substantially flush with the end portion 15 of first and second side members 11, 13.

Figure 5:
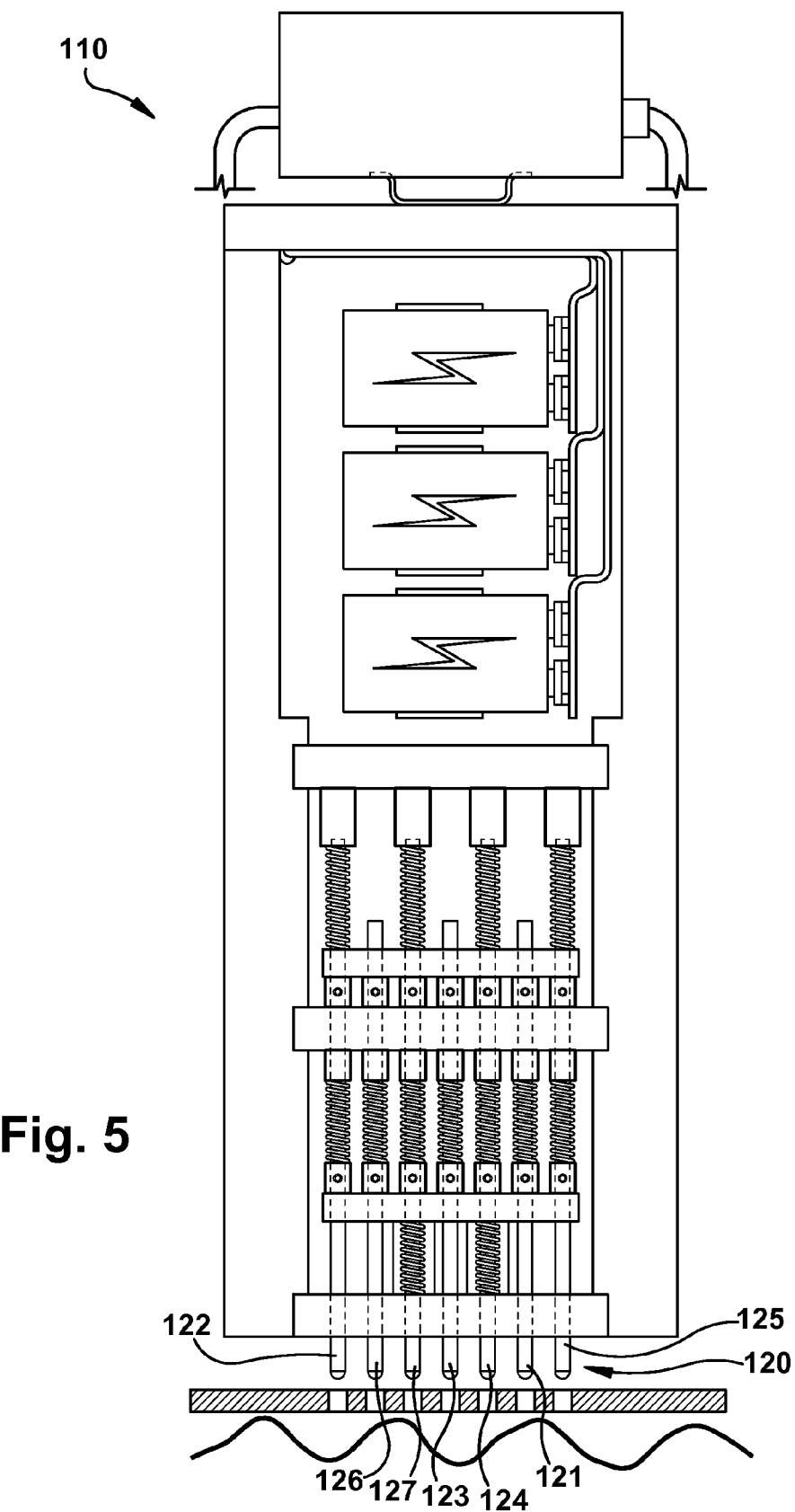
FIG. 5 shows a front side perspective view of another embodiment of the deflection and amplitude measurement tool.

As noted and further described herein, frame 12 may slidingly support set of pins 20. Each pin 21-25 is made of a substantially rigid material that resists deformity when engaged with the uneven measurement surface, e.g., a hard metal such as steel, nickel, etc., and alloys thereof. Each pin 21-25 may be individually spring biased to engage the surface to be measured. For example, each pin 21-25 may include a spring 27 that may be coaxial with a respective pin in the set of pins 20 to bias the pin against the measurement surface. Although illustrated as being coaxial, it is envisioned that spring 27 need not be coaxial. Further, although a spiral spring element has been illustrated, other mechanisms for creating the necessary bias may be employed, e.g., pneumatic rams, hydraulic rams, etc. In addition, each pin 21-25 may include a low point stop 32 and a high point stop 34 fixedly coupled to each pin 21-25. The purpose of each stop will be described elsewhere herein. The number of pins in set of pins 20 may be equal to a number of holes 7 in a component or wedge 6 that is securing the uneven measurement surface or ripple spring 8. Although five pins 21-25 have been illustrated, any number capable of accurately capturing a high point and low point of the measurement surface to a user's satisfaction may be employed. For example, measurement tool 10 may include two to seven pins. FIG. 5 shows an embodiment of the invention wherein set of pins 120 of measurement tool 110 includes seven pins 121-127. In this embodiment, measurement tool 110 looks like and works in a substantially similar manner as discussed herein, however, seven pins 121-127 may engage ripple spring 8.

Low point isolator member 40 and high point isolator member 50 interact with low point stops 32 and high point stops 34 on pins 21-25 to identify a lowest point and a highest point of uneven measurement surface engaged by the pins. That is, a highest point and a lowest point at which a pin 21-25 engages the measurement surface through the holes in the component securing the uneven measurement surface. A difference between the lowest point and the highest point indicates an amplitude of the uneven measurement surface. The amplitude can be indicative of the deflection of the uneven measurement surface when the amplitude of the uneven measurement surface in a free-state is known as will be described herein.

In order to determine the lowest point, low point isolator member 40 may be moveable relative to frame 12 such that low point isolator member 40 indicates a lowest point of the uneven measurement surface. FIGS. 2-4 show low point isolator member 40 disposed between first cross-member 14 and third cross-member 18, however it is to be understood that low point isolator member 40 may be disposed anywhere within frame 12 that it can indicate a lowest point of the uneven measurement surface without departing from embodiments of the invention.

As shown in FIGS. 2, 3, and 4, low point isolator member 40 may include a low point stop engaging element 42 for engaging a lowest one of low point stops 32 to determine a lowest point engaged by one of set of pins 20 by the position of low point isolator member 40. Low point stop engaging element 42 may include material sufficient to resist distortion during movement such as a hard plastic or a metal, e.g., aluminum. Low point stop engaging element 42 may include alignment openings 46 through which set of pins 20 extend. Low point stop engaging element 42 may be substantially perpendicular to set of pins 20 such that alignment openings 46 may slidingly receive and align each pin 21-25 in set of pins 20, i.e., such that the pins 21-25 slide substantially parallel to one another and relative to frame 12. Additionally, where a high point sensor engaging element 54, details described elsewhere, extends toward first cross-member 14, low point stop engaging element 42 may include an alignment opening 48 for slidingly receiving high point sensor engaging element 54.

Low point isolator member 40 may also include a low point sensor engaging element 44 for engaging low point displacement sensor 60 as discussed further herein. Low point sensor engaging element 44 may extend from low point stop engaging element 42 toward low point sensor displacement 60. Low point displacement sensor 60 may include a sensor tip 62. Low point sensor tip 62 may directly abut low point sensor engaging element 44. In this embodiment, low point displacement sensor 60 will identify a low point displacement based on the change in position of the low point sensor engaging element 44 in response to low point stop engaging element 42 being engaged by the lowest of the low point stops 32. Additionally, low point sensor engaging element 44 may extend partially toward first cross-member 14. Low point sensor engaging element 44 may be connected to low point stop engaging element 42 by any conventional means such as, but not limited to a screw or a bolt. Third cross-member 18 may include alignment openings 98 for slidingly receiving low point sensor engaging element 44.

In an alternative embodiment, low point displacement sensor 60 may include an elongated sensor tip 62 that extends through alignment openings 98 to engage low point stop engaging element 42. In this embodiment, low point displacement sensor 60 will identify a low point displacement based on the change in position of low point stop engaging element 42 in response to low point stop engaging element 42 being engaged by the lowest of the low point stops 32. In this case, low point sensor engaging element 44 may be omitted. The structure would look substantially similar to that shown in the drawings except sensor tip 62 would engage low point stop engaging element 44.

In order to achieve indication of the lowest point of the uneven measurement surface, low point isolator member 40, e.g., via low point stop engaging element 42, may be biased to engage the lowest (vertically as illustrated) of low point stops 32 corresponding to the lowest pin in set of pins 20. For example, low point isolator member 40 may be spring biased by at least one spring 90. The at least one spring 90 may be coaxial with a pin in set of pins 20, e.g., pin 24 (FIG. 1) as illustrated. Although a spiral spring element has been illustrated, other mechanisms for creating the necessary bias may be employed, e.g., pneumatic rams, hydraulic rams, etc. One or more springs 90 (one shown on pin 24) may be coaxially surrounded by a detent 92 that acts to define a lower extent of motion of low point isolator member 40 and also the extent to which pins 21-25 extend from frame 12, i.e., stroke length. Detent 92 may be made of plastic or other suitably rigid material, e.g., a metal such as aluminum. Although spring(s) 90 and detent(s) 92 are illustrated as being coaxial with pin 24 of set of pins 20 and with each other, it is envisioned that neither need be coaxial with a pin or each other. In any event, detent 92 may be disposed between first cross-member 14 and low point isolator member 40. The minimum spacing between low point isolator member 40 and first cross-member 14 will correspond to the length of detent 92. As will be described, low point isolator member 40 is positioned by a lowest one of low point stops 32 yet detent 92 determines the stroke length of the pins 21-25 in the set of pins 20. That is, the lowest position at which low point isolator member 40 will be disposed corresponds to the height of detent 92, since detent 92 may abut both first cross-member 14 and low point isolator member 40.

Low point stop 32 of each pin is configured to engage low point stop engaging element 42 such that low point stop 32 corresponding to pin 21-25 in set of pins 20 that is positioned at the lowest point of the uneven measurement surface will engage and position low point isolator member 40. Thus, low point stop 32 of the lowest pin in set of pins 21-25 determines the change in position of low point isolator member 40.

In order to measure the position of low point isolator member 40, low point displacement sensor 60 may be fixedly coupled to frame 12. For example, as shown in FIG. 3, low point displacement sensor 60 may be fixedly coupled to second cross-member 16 or other structure of frame 12, e.g., a plastic board positioned between cross-members 16, 19. Low point displacement sensor 60 identifies a low point displacement of the uneven measurement surface. For example, low point displacement sensor 60 may include a KEYENCE GT2 Intelligent Series Contact Sensor, or similar sensor. The low point displacement indicates the change in position of low point isolator member 40 based on low point isolator member 40 being engaged by the lowest one of low point stops 32 that is coupled to the pin in set of pins 20 positioned at the lowest point on the uneven measurement surface. For example, in FIG. 5, the lowest pin is 21, thus low point stop 32 coupled to pin 21 positions low point stop engaging member 42.

Low point displacement sensor 60 may include a sensor tip 62. Sensor tip 62 may be spring biased toward low point isolator member 40, or, where provided, low point sensor engaging element 44. In one embodiment, low point displacement sensor tip 62 may directly abut low point stop engaging element 42 of low point isolator 40. As discussed previously, in this embodiment, low point displacement sensor 60 will identify a low point displacement based on the change in position of low point stop engaging element 42 in response to low point stop engaging element 42 being engaged by the lowest of low point stops 32. In an alternative embodiment, wherein low point isolator member 40 includes low point sensor engaging element 44 coupled to and extending from low point stop engaging element 42, low point sensor tip 62 may directly abut low point sensor engaging element 44. In this embodiment, low point displacement sensor 60 will identify a low point displacement based on the change in position of low point sensor engaging element 44 in response to low point stop engaging element 42 being engaged by the lowest of low point stops 32.

In order to determine the highest point, high point isolator member 50 may be moveable relative to frame 12 such that high point isolator member 50 indicates a highest point of the uneven measurement surface. FIGS. 2-4 show high point isolator member 50 disposed between second cross-member 16 and third cross-member 18, however it is to be understood that high point isolator member 50 may be disposed anywhere within frame 12 that it can indicate a highest point of the uneven measurement surface without departing from embodiments of the invention.

As shown in FIGS. 2, 3, and 4, high point isolator member 50 may include a high point stop engaging element 52 for engaging a highest one of high point stops 34 to determine a highest point engaged by a pin 21-25 in the set of pins 20. High point stop engaging element 52 may include material sufficient to resist distortion during movement such as a hard plastic or a metal, e.g., aluminum. High point stop engaging element 52 may include alignment openings 56 through which set of pins 20 extend. High point stop engaging element 52 may be substantially perpendicular to set of pins 20 such that alignment openings 56 may slidingly receive and align each pin 21-25 in set of pins 20, i.e., such that the pins 21-25 slide substantially parallel to one another and relative to frame 12. Additionally, wherein high point isolator member 50 is disposed between low point isolator member 40 and low point displacement sensor 60, high point stop engaging element 52 may include an alignment opening 58 for slidingly receiving low point sensor engaging element 44 as discussed herein.

High point isolator member 50 may also include a high point sensor engaging element 54 for engaging high point displacement sensor 70 as discussed further herein. High point sensor engaging element 54 may extend from high point stop engaging element 52 toward high point sensor 70. High point sensor 70 may include a sensor tip 72. High point sensor tip 72 may directly abut high point sensor engaging element 54. In this embodiment, high point displacement sensor 70 will identify a high point displacement based on the change in position of high point sensor engaging element 54 in response to high point stop engaging element 52 being engaged by the highest of the high point stops 52. High point sensor engaging element 54 may be connected to high point stop engaging element 52 by any conventional means such as, but not limited to a screw or a bolt. Third cross-member 18 may include alignment openings 98 for slidingly receiving high point sensor engaging element 54. Additionally, high point sensor engaging element 54 may extend toward first cross-member 14. In this embodiment, low point stop engaging element 42 may include alignment openings 48 for slidingly receiving high point sensor engaging element 54. In this fashion, sensor engaging elements 44, 54 act to provide additional alignment of parts. In an alternative embodiment, high point displacement sensor 70 may include an elongated sensor tip 72 that extends to engage high point stop engaging element 52. In this embodiment, high point displacement sensor 70 will identify a high point displacement based on the change in position of high point stop engaging element 52 in response to high point stop engaging element 52 being engaged by the highest of the high point stops 34. In this case, high point sensor engaging element 54 may be omitted. The structure would look substantially similar to that shown in the drawings except sensor tip 72 would engage high point stop engaging element 54.

In order to achieve indication of the highest point of the uneven measurement surface, high point isolator member 50, e.g., via high point stop engaging element 52, may be biased to engage the highest (vertically as illustrated) of high point stops 34 corresponding to the highest pin in set of pins 20. For example, high point isolator member 50 may be spring biased by at least one spring 94. The at least one spring 94 may be coaxial with one or more pins in set of pins 20, e.g., three springs 94 illustrated in FIG. 1. Although a spiral spring element has been illustrated, other mechanisms for creating the necessary bias may be employed, e.g., pneumatic rams, hydraulic rams, etc. One or more springs 94 (one shown on each of pins 22, 24, 25) may each abut a spring seat 96 that may be coupled to a respective pin 21-25 in the set of pins. Spring 94 may extend beyond an end of its respective pin toward second cross-member 16 in order to contact second cross member 16 or spring seat 96. Spring 94 acts to bias pins to engage uneven measurement surface and to prevent an end of each pin 21-25 in set of pins 20 from directly contacting second cross-member 16 or spring seat 96. Spring seat 96 may be made of plastic or other suitably rigid material, e.g., a metal such as aluminum. Each spring seat 96 may abut second cross-member 16 to bias high point stop engaging element 52 into contact with the highest one of high point stops 34. Alternatively, spring(s) 94 may directly abut second cross-member 16 in response to their respective pins, e.g., 22, 24, 25.

High point stop 34 of each pin is configured to engage high point stop engaging element 52 such that high point stop 34 corresponding to the pin in the set of pins 21-25 that is positioned at the highest point of the uneven measurement surface will engage and position high point isolator member 50. Thus, high point stop 34 of the highest pin in set of pins 21-25 determines the change in position of high point isolator member 50.

In order to measure the position of high point isolator member 50, high point displacement sensor 70 may be fixedly coupled to frame 12. For example, as shown in FIG. 3, high point displacement sensor 70 may be fixedly coupled to second cross-member 16 or other structure of frame 12, e.g., a plastic board positioned between cross-members 16, 19. High point displacement sensor 70 identifies a high point displacement of the uneven measurement surface. For example, high point displacement sensor 70 may be a KEYENCE GT2 Intelligent Series Contact Sensor, or similar sensor. The high point displacement indicates the change in position of the high point isolator member 50 based on the high point isolator member 50 being engaged by the highest one of the high point stops 34 that is coupled to the pin in the set of pins 20 positioned at the highest point on the uneven measurement surface. For example, in FIG. 5, the highest pin is 22, thus the high point stop 34 coupled to pin 22 positions high point stop engaging member 52.

High point displacement sensor 70 may include a sensor tip 72. Sensor tip 72 may be spring biased toward high point isolator member 50, or, where provided, high point sensor engaging element 54. In one embodiment, high point displacement sensor tip 72 may directly abut high point stop engaging element 52 of high point isolator 50. As discussed previously, in this embodiment, high point displacement sensor 70 will identify a high point displacement based on the change in position of the high point stop engaging element 34 in response to high point stop engaging element 52 being engaged by the highest of the high point stops 34. In an alternative embodiment, wherein high point isolator member 50 includes high point sensor engaging element 54 coupled to and extending from high point stop engaging element 52, high point sensor tip 72 may abut high point sensor engaging element 54. In this embodiment, high point displacement sensor 70 will identify a high point displacement based on the change in position of the high point sensor engaging element 54 in response to high point stop engaging element 52 being engaged by the highest of the high point stops 34.

Calculator 80 may be used to calculate a difference between the low point displacement and the high point displacement, wherein the difference equals an amplitude of the uneven measurement surface. Where the free-state of the ripple spring is known, it can be programmed into calculator 80 and a deflection of the ripple spring 8 may be calculated. As noted above, a "free-state" is a state in which, e.g., a ripple spring, is uncompressed or otherwise uninfluenced by a shape changing force. For a ripple spring, this state would be outside of the stator core winding slot and otherwise uncompressed. The deflection may be represented by the difference between the amplitude of the uneven measurement surface as indicated by isolator members 40, 50 and the amplitude of the uneven measurement surface in the free-state. Based on the particular application, particular deflection thresholds may be applicable. For example, a free-state amplitude for a particular ripple spring may be 2.0 centimeters, and an operational amplitude range that provides a desirable compression may be between 1.0 centimeters and 1.5 centimeters. Here, a deflection value between 0.5 and 1.0 centimeters would be acceptable. Measurements using tool 10 that indicate a deflection less than 0.5 (too much compression) or greater than 1.0 (too little compression) indicate an improper compression level of the particular ripple spring. In one optional embodiment, calculator 80 can be configured to provide an alarm, e.g., a flashing light, an audible alarm, etc., where an unacceptable deflection is measured.

Calculator 80 may include any now known or later developed calculator system such as general purpose computing articles of manufacture (e.g., computing devices) capable of executing a computer program code installed thereon for calculating the amplitude of the uneven measurement surface as discussed herein. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the program code can be embodied as any combination of system hardware and/or application software.

Calculator 80 may be fixedly coupled to frame 12, e.g., by fasteners, such that calculator 80 is also substantially surrounded by housing 2. Calculator 80 may be communicatively coupled to the low point displacement sensor 60 and high point displacement sensor 70 such that calculator 80 receives a low point displacement from the low point displacement sensor 60 and a high point displacement from the high point displacement sensor 70. For example, low point sensor 60 and high point sensor 70 may each include wiring 82 (FIG. 3) that connects low point sensor 60 and high point sensor 70 to calculator 80. However, it is to be understood that the wiring 82 is minimal and may be enclosed in housing 2. While calculator 80 and displacement sensors 60, 70 are shown having wiring 82, it should be understood that calculator 80 may be alternatively in wireless communication with displacement sensors 60, 70.\

Figure 6:
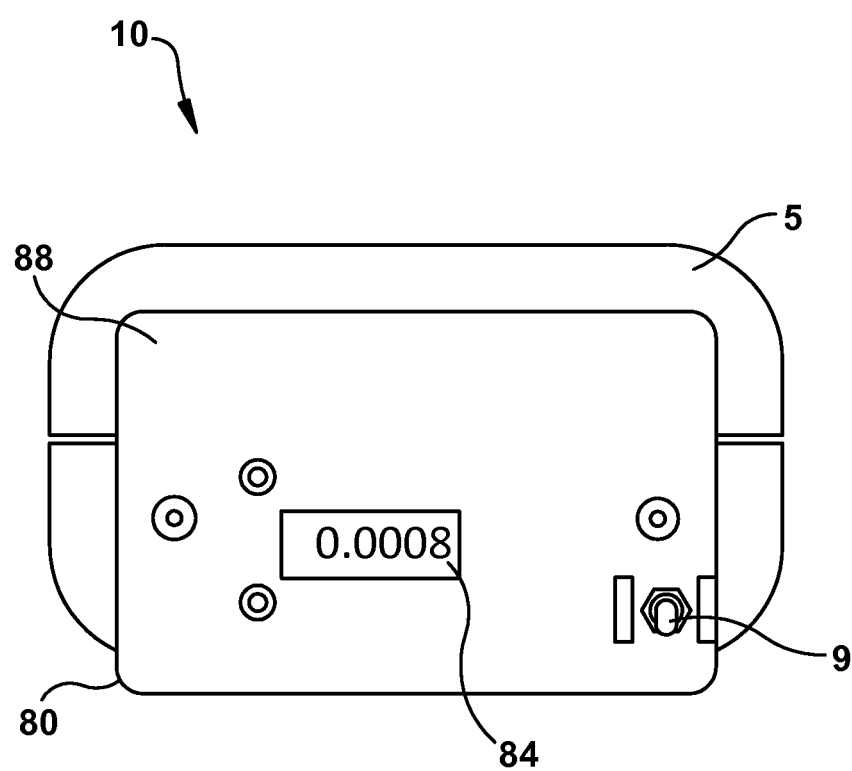
FIG. 6 shows a top-down view of the deflection and amplitude measurement tool.

FIG. 6 shows a top-down view of the measurement tool 10 wherein calculator 80 includes a display 84 for displaying the difference between the high point displacement and the low point displacement or the deflection measurement. Display 84 may be a screen capable of displaying a measurement value calculated by calculator 80. Additionally, end portion 5 of measurement tool 10 may include a window 88 for viewing the measurement value on display 84 since calculator 80 is surrounded by housing 2. Window 88 may be made of any material that may enable the user of the tool 10 to view display 84, e.g., clear plastic or glass. Calculator 80 and displacement sensors 60, 70 may each be powered by batteries 86.

Figure 7:
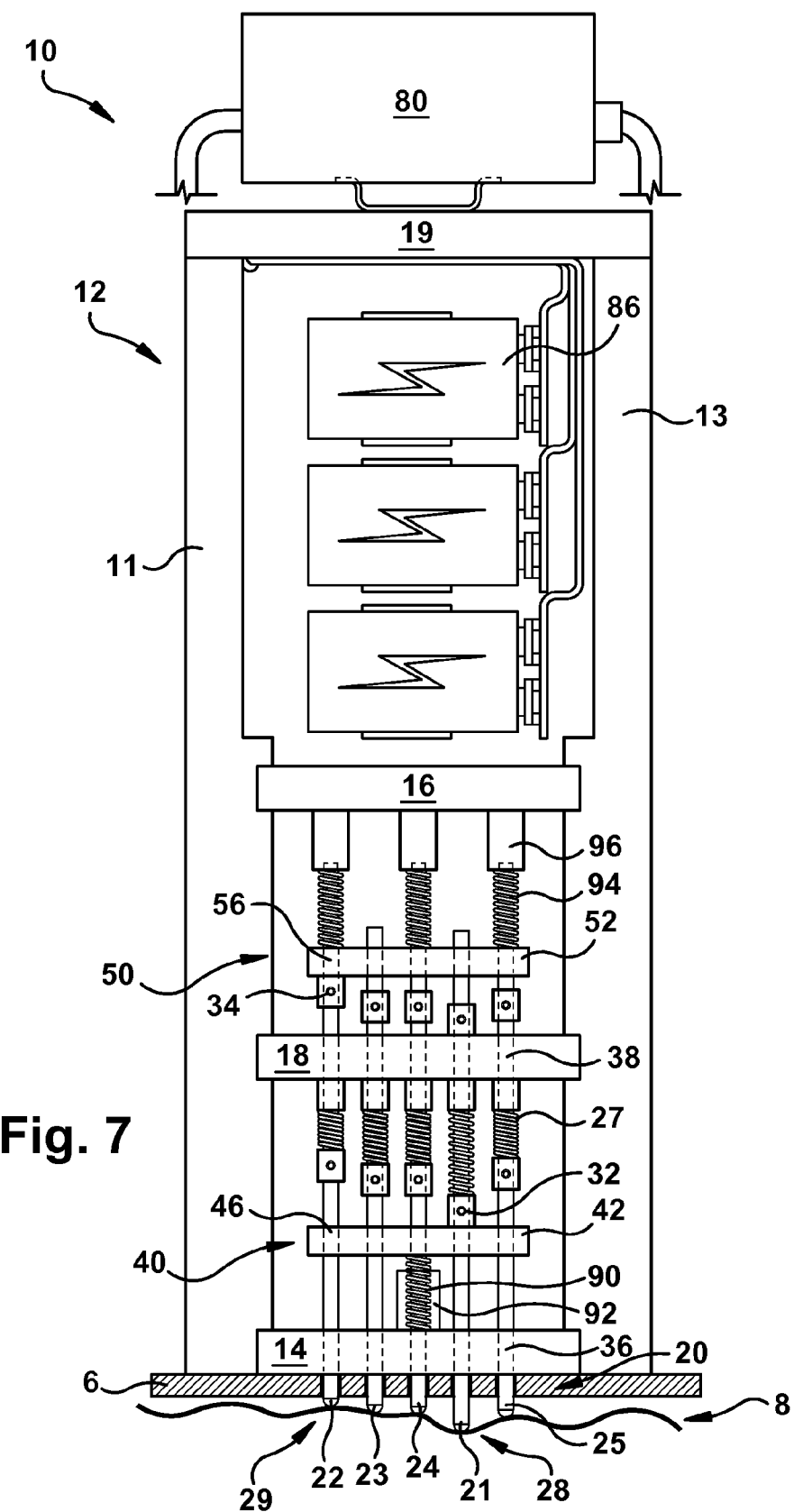
FIG. 7 shows a front side perspective view of the embodiment shown in FIG. 2 engaging an uneven measurement surface.
Figure 8:
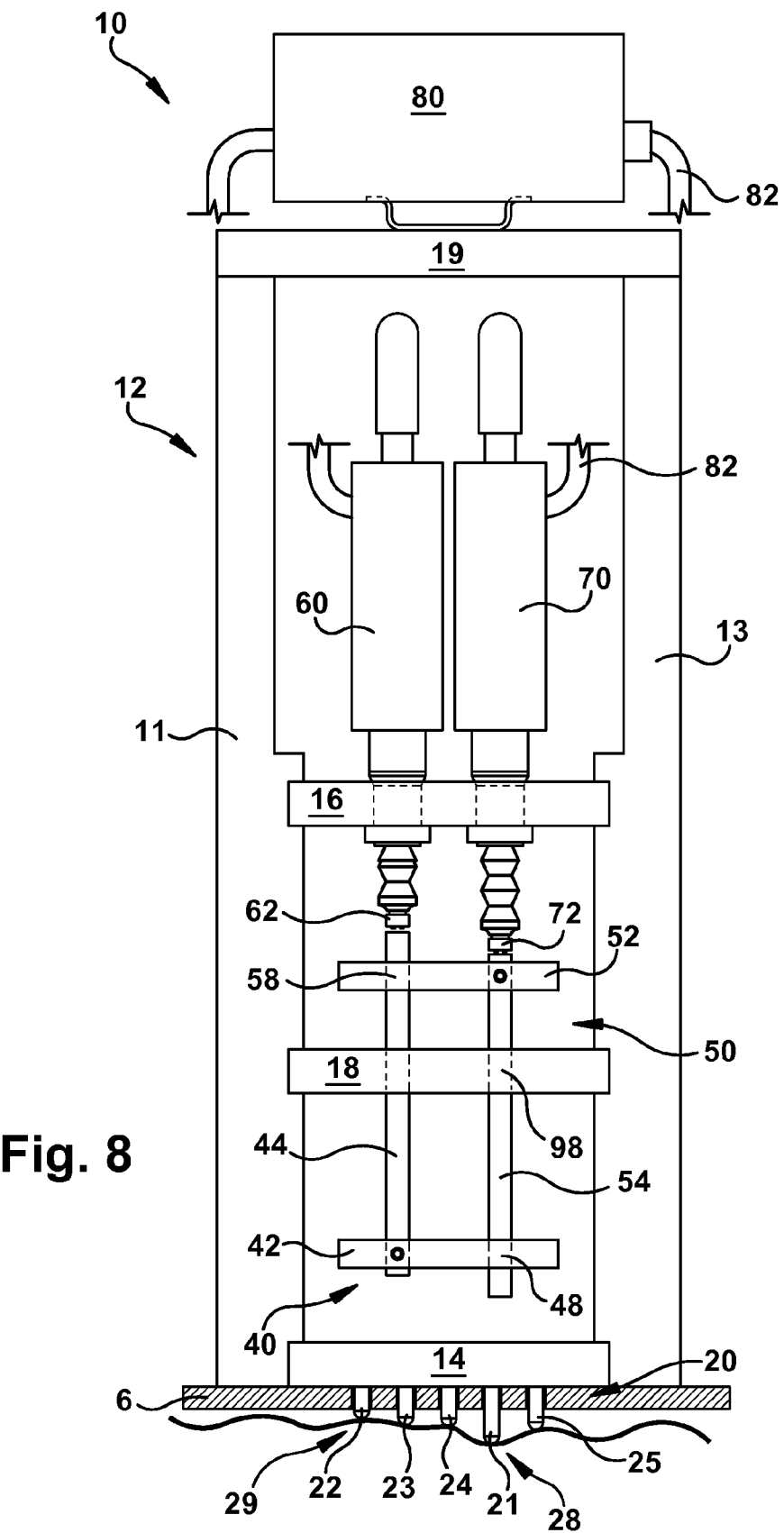
FIG. 8 shows a perspective side view of the embodiment shown in FIG. 3 engaging an uneven measurement surface.

FIGS. 7 and 8 show measurement tool 10 of FIGS. 2 and 3 respectively, engaging an uneven measurement surface, such as a ripple spring 8. It is to be understood that FIG. 8 is shown including set of pins 20 for ease of understanding, however, the engagement of the ripple spring in FIG. 8 corresponds to the embodiment of the invention as shown in FIG. 3. As the set of pins 20 pass through holes 7 of wedge 6 and contact ripple spring 8, each pin 21-25 in set of pins 20 change position based on their interaction with ripple spring 8. For example as shown in FIG. 7, set of pins 20 may include a first pin 21, a second pin 22, a third pin 23, a fourth pin 24, and a fifth pin 25. In this embodiment, each pin 21-25 contacts ripple spring 8 and slides within alignment openings 36, 38 of cross-members 14, 18 and alignment openings 46, 56 of isolator members 40, 50 to adjust to their relative position to ripple spring 8.

First pin 21 contacts ripple spring 8 at a lowest point 26 of ripple spring 8. First pin 21 may include low point stop 32 as discussed above relative to FIGS. 2-4. Low point stop 32 of first pin 21 is engaged by low point isolator member 40. Thus, the position of low point isolator member 40 is determined by the position of the low point stop 32 of first pin 21. That is, since low point isolator member 40 is spring biased toward low point displacement sensor 60, when set of pins 20 contacts ripple spring 8, each pin 21-25 will be engaged relative to their respective position on ripple spring 8. Low point stops 32 are coupled to each pin 21-25, thus as pins 21-25 move relative to their position on the ripple spring 8, low point stops 32 will move with their respective pin 21-25. Therefore, low point stops 32 will move toward low point displacement sensor 60, and thus, low point isolator member 40 will also move toward displacement sensor 60 because it is spring biased to move in that direction by spring 90 as discussed above relative to FIGS. 2-4. As the lowest of low point stops 32 moves toward low point displacement sensor 60, it releases low point isolator member 40 such that spring 90 biasing low point isolator member 40 forces low point isolator member 40 away from detent 92 and toward low point displacement sensor 60 until it abuts the lowest of low point stops 32. Therefore, the low point isolator member 40 will only move as far as the lowest of low point stops 32.

Low point isolator member 40 engages sensor tip 62 of low point displacement sensor 60. In one embodiment, low point isolator member 40 may engage sensor tip 62 of low point displacement sensor 60 via low point stop engaging element 42. In another embodiment, as shown in FIG. 8, low point isolator member 40 may engage low point sensor tip 62 via low point sensor engaging element 44 as described above relative to FIGS. 2-4. In this embodiment, low point sensor engaging element 44 may slide within alignment opening 98 of third cross-member 18 to engage low point sensor tip 62. Additionally, wherein high point isolator member 50 is disposed between low point isolator member 40 and low point sensor 60 (as shown in FIGS. 2-5), low point sensor engaging element 44 may slide within alignment opening 58 of high point isolator member 50 to engage low point sensor tip 62.

Low point displacement sensor 60 may identify a low point displacement in response to the low point displacement sensor tip 62 being engaged by low point isolator member 40, e.g., low point sensor engaging element 44. The low point displacement representing the displacement of the low point isolator member 40. Low point displacement sensor 60 may send the identified low point displacement to calculator 80 so that calculator may calculate the amplitude of the uneven measurement surface, or the deflection of the ripple spring 8.

As shown in FIG. 7, second pin 22 contacts ripple spring 8 at a highest point 28. Second pin 22 may include a high point stop 34. High point stop 34 of second pin 22 engages high point isolator member 50. Thus, the position of high point isolator member 50 is determined by the position of the highest of high point stops 34. That is, since high point isolator member 50 is spring biased toward ripple spring 8, when set of pins 20 contact the ripple spring 8, the individual pins will be engaged relative to their respective position on the ripple spring 8. The high point stops 34 of the pins 20 are coupled to the individual pins 21-25, thus as pins 21-25 move relative to their position on ripple spring 8, high point stops 34 will move with their respective pin 21-25. Therefore, high point stops 34 will move toward the high point displacement sensor 70, and thus, high point isolator member 50 will also move toward displacement sensor 70 because it is being engaged by the highest of high point stops 34 as discussed above relative to FIGS. 2-4. As the highest of high point stops 34 moves toward high point displacement sensor 70, it remains in contact with high point isolator member 50 and forces high point isolator member 50 toward high point displacement sensor 70 compressing spring(s) 94 that is/are biasing high point isolator member 50. Spring 94 may compress against second cross-member 16 directly or against spring seat 96. Therefore, the high point isolator member 50 will only move as far as the highest of high point stops 34.

High point isolator member 50 engages sensor tip 72 of high point displacement sensor 70 in response to being engaged by high point stop 34 of second pin 22. In one embodiment, high point isolator member 50 may engage sensor tip 72 of high point displacement sensor tip 72 via high point stop engaging element 52. In another embodiment, as shown in FIG. 8, high point isolator member 50 may engage high point displacement sensor 70 via high point sensor engaging element 54 as described above relative to FIGS. 2-4. In this embodiment, high point sensor engaging element 54 may slide within alignment opening 98 of third cross-member 18 to engage high point sensor tip 72. Additionally, wherein high point isolator member 50 extends toward ripple spring 8, high point sensor engaging element 54 may slide within alignment opening 48 of low point isolator member 40.

High point displacement sensor 70 may identify a high point displacement in response to high point displacement sensor tip 72 being engaged by high point isolator member 50, e.g., high point sensor engaging element 54. The high point displacement may represent the displacement of the high point isolator member 50. High point displacement sensor 70 may send the identified high point displacement to calculator 80 so that calculator may calculate the amplitude of the uneven measurement surface, or the deflection of the ripple spring 8.

Calculator 80 may calculate the amplitude of ripple spring 8 in response to receiving the low point displacement from low point displacement sensor 60 and the high point displacement from the high point displacement sensor 70, in real time. Calculator 80 may calculate the amplitude by calculating the difference between the high point displacement and the low point displacement. The amplitude can be indicative of the deflection of the uneven measurement surface when the amplitude of the uneven measurement surface in a free-state is known. In order to obtain a deflection, a user may program the amplitude of the uneven measurement surface in the free-state into calculator 80 such that calculator 80 may calculate a difference between the amplitude as indicated by the isolator members and the amplitude in the free-state. That is, the difference between the amplitude of the uneven measurement surface as indicated by isolator members and the amplitude of the uneven measurement surface in the free-state is indicative of the deflection of the uneven measurement surface. Calculator 80 may include a display 84 for displaying a measurement indicating the amplitude of the uneven measurement surface, or the deflection of the ripple spring 8.

Deflection and amplitude measurement tool 10 as described herein is smaller than conventional measurement tools because it may be battery powered and any wiring it may require may be disposed inside the housing of tool. Due to its relatively smaller size, a user may hold and use tool with only one hand. This allows the user to easily carry and manipulate the tool in the field while taking measurements. Additionally, the measurement tool of embodiments of the present invention allows for the taking of deflection measurements much faster than conventional tools. In the ripple spring example, the user merely inserts the set of pins into the holes of a wedge securing the ripple spring, and then tool may indicate an amplitude or deflection. In total, the measurement for a single ripple spring takes about ten seconds. Conventional tools can take a number of minutes per ripple spring to take a measurement. There are many ripple spring within a single slot of a stator, and there are hundreds of slots within a single stator, therefore the amount of time necessary to measure a deflection of each ripple spring within a stator is greatly reduced by use of measurement tool described herein.

The terminology used herein is for the purpose of describing particular embodiments only and is not intended to be limiting of the disclosure. As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. It will be further understood that the terms "comprises" and/or comprising," when used in this specification, specify the presence of stated features, integers, steps, operations, elements, and/or components, but do not preclude the presence or addition of one or more other features, integers, steps, operations, elements, components, and/or groups.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

What is claimed is:

1. An apparatus to indicate an amplitude of an uneven measurement surface, the apparatus comprising,
   a frame slidingly supporting a set of pins, each pin individually spring biased to engage the uneven measurement surface, each pin including a high point stop and a low point stop fixedly coupled thereto;
   a low point isolator member moveable relative to the frame, the low point isolator member indicating a lowest point of the uneven measurement surface engaged by the set of pins based on engagement of the low point isolator member by a respective low point stop of a first pin in the set of pins that engages a low point of the uneven measurement surface;
   a high point isolator member moveable relative to the frame, the high point isolator member indicating a highest point of the uneven measurement surface engaged by the set of pins based on engagement of the high point isolator member by a respective high point stop of a second pin in the set of pins that engages a high point of the uneven measurement surface;
   a low point displacement sensor fixedly coupled to the frame, and having a first sensor tip engaging the low point isolator member for identifying a low point displacement;
   a high point displacement sensor fixedly coupled to the frame, and having a second sensor tip engaging the high point isolator member for identifying a high point displacement; and
   a calculator for calculating a difference between the low point displacement and the high point displacement, the difference indicative of the amplitude of the uneven measurement surface.

2. The apparatus of claim 1, wherein the low point isolator member includes:
   a low point stop engaging element for engaging a lowest one of the low point stops and a low point sensor engaging element, the low point sensor engaging element extending from the low point stop engaging element for engaging the sensor tip of the low point displacement sensor; and
   wherein the high point isolator member includes:
   a high point stop engaging element for engaging a highest one of the high point stops and a high point sensor engaging element, the high point sensor engaging element extending from the high point stop engaging element for engaging the sensor tip of the high point displacement sensor.

3. The apparatus of claim 1, wherein the sensor tip of the low point displacement sensor is spring biased toward the low point sensor engaging element; and wherein the sensor tip of the high point displacement sensor is spring biased toward the high point sensor engaging element.

4. The apparatus of claim 1, wherein the low point isolator member is biased to engage the lowest one of the low point stops of the pins, and wherein the high point isolator member is biased to engage a highest one of the high point stops of the pins.

5. The apparatus of claim 4, wherein the low point isolator member is biased by at least a first spring, the first spring being coaxial with a respective pin in the set of pins, and wherein the high point isolator member is biased by at least a second spring, the second spring being coaxial with a respective pin in the set of pins.

6. The apparatus of claim 1, wherein the calculator is communicatively coupled to the low point displacement sensor and the high point displacement sensor.

7. The apparatus of claim 1, wherein the calculator includes a display for displaying the difference between the high point displacement and the low point displacement.

8. The apparatus of claim 1, wherein the frame includes
   a pair of side members;
   a first cross-member coupled between the pair of side members;
   a second cross-member coupled between the pair of side members; and
   a third cross-member coupled between the pair of side members, wherein the first and third cross-members each include a set of alignment openings for slidingly receiving and aligning each pin of the set of pins.

9. The apparatus of claim 8, wherein a surface of the first cross-member extends beyond an end portion of each of the side members in the pair of side members.

10. The apparatus of claim 8, wherein the high point isolator member is biased to engage the highest one of the high point stops of the pins by a first spring,
wherein the low point isolator member is biased to engage a lowest one of the low point stops of the pins by a second spring,
wherein the first spring is coaxial with at least one pin in the set of pins, and
wherein the pin coaxial with the first spring includes a first spring seat, the first spring seat abutting a cross-member of the frame.

11. The apparatus of claim 10, wherein the second spring is coaxial with at least one pin in the set of pins, and
wherein the pin coaxial with the second spring includes a spring casing coaxial with the second spring, the spring casing determining the stroke length of the set of pins.

12. The apparatus of claim 1, wherein the set of pins includes two to seven pins.

13. The apparatus of claim 1, further comprising a housing, the housing substantially surrounding the frame, wherein the housing includes a handle.

14. The apparatus of claim 1, wherein the uneven measurement surface includes a substantially sinusoidal surface of a ripple spring.

15. The apparatus of claim 13, wherein the set of pins includes a number of pins that corresponds to a number of holes in a wedge used to secure a ripple spring in a stator core winding slot.

16. The apparatus of claim 1, wherein the sensors and calculator are battery-powered.

17. The apparatus of claim 1, wherein, in response to the set of pins engaging the uneven measurement surface,
the low point isolator member engages the first sensor tip in response to being engaged by a lowest one of the low point stops of the set of pins,
the high point isolator member engages the second sensor tip in response to being engaged by a highest one of the high point stops of the set of pins,
the low point displacement sensor identifies a low point displacement in response to the first sensor tip being engaged by the low point isolator member,
the high point displacement sensor identifies a high point displacement in response to the second sensor tip being engaged by the high point isolator member, and
the calculator calculates the difference between the low point displacement and the high point displacement in response to receiving the low point displacement from the low point displacement sensor and the high point displacement from the high point displacement sensor.

18. A system for measuring a deflection of a ripple spring in a stator core winding slot from a free-state of the ripple spring, the system comprising,
a frame slidingly supporting a set of pins, each pin individually spring biased to engage the ripple spring, each pin including a high point stop and a low point stop fixedly coupled thereto,
a low point isolator member moveable relative to the frame, the low point isolator member indicating a lowest point of the ripple spring engaged by the set of pins based on engagement of the low point isolator member by a respective low point stop of a first pin in the set of pins that engages a low point of the ripple spring;
a high point isolator member moveable relative to the frame, the high point isolator member indicating a highest point of the ripple spring engaged by the set of pins based on engagement of the high point isolator member by a respective high point stop of a second pin in the set of pins that engages a high point of the ripple spring;
a low point displacement sensor fixedly coupled to the frame, and having a sensor tip engaging the low point isolator member for identifying a low point displacement;
a high point displacement sensor fixedly coupled to the frame, and having a sensor tip engaging the high point isolator member for identifying a high point displacement; and
a calculator for calculating a difference between the low point displacement and the high point displacement, the difference indicative of the deflection of the ripple spring.

19. The system of claim 18, wherein the low point isolator member includes:
a low point stop engaging element for engaging a lowest one of the low point stops and a low point sensor engaging element, the low point sensor engaging element extending from the low point stop engaging element for engaging the sensor tip of the low point displacement sensor; and
wherein the high point isolator member includes:
a high point stop engaging element for engaging a highest one of the high point stops and a high point sensor engaging element, the high point sensor engaging element extending from the high point stop engaging element for engaging the sensor tip of the high point displacement sensor.

20. The system of claim 18, wherein the sensor tip of the low point displacement sensor is spring biased toward the low point sensor engaging element; and
wherein the sensor tip of the high point displacement sensor is spring biased toward the high point sensor engaging element.

21. The system of claim 18, wherein the low point isolator member is biased to engage the lowest one of the low point stops of the pins,
wherein the high point isolator member is biased to engage a highest one of the high point stops of the pins,
wherein the low point isolator member is biased by at least a first spring, the first spring being coaxial with a respective pin in the set of pins, and
wherein the high point isolator member is biased by at least a second spring, the second spring being coaxial with a respective pin in the set of pins.

22. A probe assembly for measuring an amplitude of an uneven measurement surface, the probe assembly comprising;
a frame slidingly supporting a set of pins, each of the set of pins being individually spring biased to engage the uneven measurement surface, each pin including a high point stop and a low point stop fixedly coupled thereto;
means for sensing a low point displacement at a low point of the uneven measurement surface and a high point displacement at a high point of the uneven measurement surface based on a location of two of the set of pins; and a calculator for calculating a difference between the low point displacement and the high point displacement, the difference indicative of the amplitude of the uneven measurement surface.

* * * * *